(12) United States Patent
Malekkhosravi et al.

(10) Patent No.: US 8,392,865 B2
(45) Date of Patent: Mar. 5, 2013

(54) SEMICONDUCTOR DEVICE METAL PROGRAMMABLE POOLING AND DIES

(75) Inventors: Behnam Malekkhosravi, La Jolla, CA (US); David Ian West, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 104 days.

(21) Appl. No.: 13/018,055

(22) Filed: Jan. 31, 2011

(65) Prior Publication Data

US 2011/0121467 A1    May 26, 2011

Related U.S. Application Data

(62) Division of application No. 11/874,164, filed on Oct. 17, 2007, now Pat. No. 7,882,453.

(51) Int. Cl.
*G06F 17/50* (2006.01)
(52) U.S. Cl. ........ 716/128; 716/129; 716/130; 716/131; 326/38; 326/39
(58) Field of Classification Search .......... 716/128–131; 326/38–39
See application file for complete search history.

(56) References Cited

U.S. PATENT DOCUMENTS

| | | | |
|---|---|---|---|
| 5,725,995 A | 3/1998 | Leedy | |
| 6,181,011 B1 | 1/2001 | Rostoker et al. | |
| 6,209,118 B1 | 3/2001 | LaBerge | |
| 6,225,143 B1 | 5/2001 | Rao et al. | |
| 6,356,958 B1 | 3/2002 | Lin | |
| 6,358,775 B1 | 3/2002 | Hsia | |
| 6,952,814 B2 | 10/2005 | Joseph et al. | |
| 6,961,919 B1 * | 11/2005 | Douglass | 716/104 |
| 7,002,419 B2 | 2/2006 | Schmitt et al. | |
| 7,032,191 B2 | 4/2006 | Malekkhosravi et al. | |
| 7,161,175 B2 | 1/2007 | Shau | |
| 7,243,315 B2 | 7/2007 | Tan et al. | |
| 7,259,586 B2 * | 8/2007 | Peterson et al. | 326/38 |
| 7,292,063 B2 | 11/2007 | Savage et al. | |
| 7,305,646 B2 * | 12/2007 | McGrath et al. | 326/38 |
| 7,310,758 B1 | 12/2007 | Cossoul et al. | |
| 7,373,629 B2 | 5/2008 | McGrath et al. | |
| 7,380,232 B1 * | 5/2008 | Schumacher et al. | 716/104 |

(Continued)

FOREIGN PATENT DOCUMENTS

| | | |
|---|---|---|
| JP | 58007847 A | 1/1983 |
| JP | 7086537 A | 3/1995 |

(Continued)

OTHER PUBLICATIONS

International Search Report on related PCT application (PCT/US2008/080096) from International Searching Authority (KR) dated Jun. 15, 2009.

(Continued)

*Primary Examiner* — Naum Levin
(74) *Attorney, Agent, or Firm* — Knobbe Martens Olson & Bear, LLP

(57) ABSTRACT

A pool of die designs includes die designs having metal programmable base layers. Die designs from the pool are selected for use in fabricating dies. Die designs are added to the pool by customization of die designs already in the pool or by preparing custom die designs that incorporate a metal programmable base layer. In some embodiments multi-tile dies are provided with I/O slots configurable for either inter tile communication or inter die communication.

4 Claims, 8 Drawing Sheets

U.S. PATENT DOCUMENTS

| | | | |
|---|---|---|---|
| 7,424,696 B2 * | 9/2008 | Vogel et al. | 716/133 |
| 7,439,731 B2 * | 10/2008 | Crafts et al. | 324/756.03 |
| 7,478,354 B2 | 1/2009 | McGrath et al. | |
| 7,620,924 B2 | 11/2009 | Delp et al. | |
| 7,627,838 B2 | 12/2009 | Keswick | |
| 7,642,809 B2 | 1/2010 | Malekkhosravi et al. | |
| 7,653,884 B2 * | 1/2010 | Furnish et al. | 716/103 |
| 7,882,453 B2 | 2/2011 | Malekkhosravi et al. | |
| 2005/0062156 A1 | 3/2005 | Alter et al. | |
| 2005/0093573 A1 | 5/2005 | Madurawe | |
| 2005/0166170 A1 | 7/2005 | Zarkesh-Ha et al. | |
| 2005/0273749 A1 | 12/2005 | Kirk | |
| 2006/0253825 A1 * | 11/2006 | McGrath et al. | 716/12 |
| 2007/0152708 A1 | 7/2007 | Madurawe et al. | |
| 2008/0143379 A1 | 6/2008 | Norman | |
| 2008/0309370 A1 | 12/2008 | Spangaro | |

FOREIGN PATENT DOCUMENTS

JP  9160941 A  6/1997

OTHER PUBLICATIONS

Written Opinion on corresponding PCT application (PCT/US2008/080096) from International Searching Authority (KR) dated Jun. 15, 2009.

Notice of Allowance from USPTO dated Sep. 21, 2010 for U.S. Appl. No. 11/874,164.

China State Intellectual Property Office, (in Chinese with English Translation attached) First Office Action, Aug. 10, 2011, for Application No. 200880111960.8.

* cited by examiner

SEMICONDUCTOR DEVICE METAL PROGRAMMABLE POOLING AND DIES

CROSS REFERENCE TO RELATED APPLICATIONS

The present application is a divisional of U.S. patent application Ser. No. 11/874,164, filed Oct. 17, 2007, now U.S. Pat. No. 7,882,453 the disclosure of which is incorporated herein by reference.

BACKGROUND OF THE INVENTION

The present invention relates generally to semiconductor integrated circuit designs and dies, and more particularly to extendable semiconductor integrated circuit designs and dies.

Custom design of chips for integrated circuitry allows a chip designer the opportunity to optimize circuitry within a chip to account for speed, footprint and power, and yield issues. Thus, custom design of chips for integrated circuitry generally provides chips operating at the highest clock rates, having the lowest footprint and power consumption, and potentially the highest manufacturing yields. Such customized chips provide the opportunity for increased chip functionality and decreased manufacturing costs, particularly for high volumes of chips.

Definition, design, and test of custom chips can be a long, laborious, risky, and expensive process. Custom design flows generally include RTL coding, synthesis, timing analysis, place and route, as well as verification within and at potentially each step. Errors and problems may occur at each of these steps, and each of the steps and other steps or indeed the entire process, may need to be revisited, possibly multiple times. Moreover, depending on any particular design, yield may be adversely effected by design flaws or other inadequacies in the design.

The use of IP blocks, such as third party IP blocks, within a custom chip can reduce risk and design costs. The use of third party IP blocks can also be problematic, however. The third party IP block may have been designed using a different design flow than that used for the rest of the custom chip, introducing the possibility of errors and increased integration effort in integrating the third party IP. For example, third party IP may have been modeled using different process parameters than those used for the rest of the chip, potentially making the models, and thus expected chip operation, inaccurate. The third party IP block may also not be optimized for the manufacturing process used for the chip, introducing potential yield issues.

An alternative to a custom design process is the use of, for example, a field programmable gate array (FPGA). FPGAs, however, generally exhibit reduced clock speeds, resulting in reduced performance, and increased footprint, which often implies increased power consumption. In addition FPGAs often require increased production costs, considering that the FPGA chip generally includes gates for a wide variety of uses. In addition, FPGAs may have limitations in terms of floor space available for on-board memory or other specific items, further restricting the scope of use of FPGAs.

The possibility of including at least some metal programmable elements, such as phase-locked loops (PLLs), on an integrated circuit die is known. During fabrication a PLL with particular characteristics, selected of a few possible characteristics, may be devised by interconnecting particular components available to make up the PLL. In many instances, however, merely changing an aspect of an operation of a particular component on a die of an integrated circuit is insufficient to provide for increased capabilities for a range of possible functions.

SUMMARY OF THE INVENTION

The present invention provides a pool of metal programmable dies and metal programmable multi-tile dies.

In one aspect the invention provides a method of forming a pool of die designs for use in manufacturing dies, comprising receiving a pool of die designs, each of the die designs providing for a metal programmable base layer; selecting a die design for use in fabrication of a die if a die design in the pool of die designs provides a desired functionality; selecting a die design for customization and fabrication of a die if a die design in the pool of die designs provides a sufficient level of desired functionality, a sufficient level of desired functionality being a level of functionality which is a desired level of functionality after customization of the die design; customizing the die design; and adding the customized die design to the pool of die designs. In a further aspect the invention further provides determining that no die design in the pool of die designs provides a desired functionality or a sufficient level of desired functionality; forming a custom die design for use in fabrication of a die, the custom die design providing for a metal programmable base layer, the custom die design providing the desired functionality; and adding the custom die design to the pool of die designs.

In another aspect the invention provides a multi-tile die, comprising a plurality of tiles of a wafer forming a single die; each of the plurality of tiles including I/O slots; at least some of the I/O slots including a base layer configurable either for providing off die electrical signal communication or for providing intra die electrical signal communication; with the base layer configurable by metallization.

These and other aspects of the invention are more readily comprehended on review of this disclosure.

DETAILED DESCRIPTION

Figure 1:
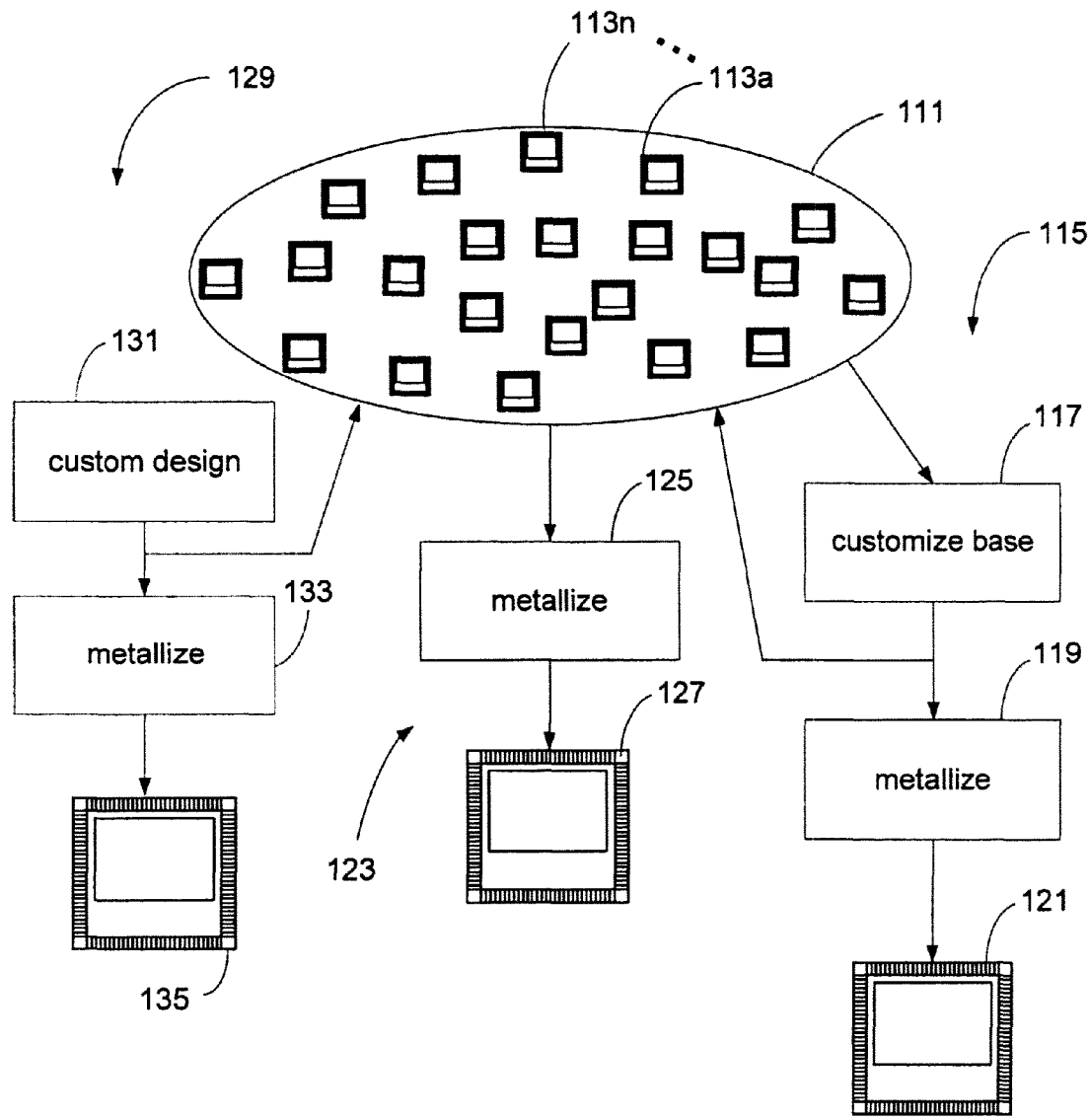
FIG. 1 is a pseudo block diagram of a process flow in accordance with aspects of the invention.

FIG. 1 illustrates process flows in accordance with aspects of the invention. A pool 111 includes a plurality of metal programmable dies. In general the pool does not include actual physical dies, instead including design information for a plurality of a different metal programmable dies. The programmable dies generally include a number of selectable blocks or components formed in semiconductor layers of the die, which may be referred to together as a base layer, which may be interconnected by metallization. Thus, the die may be considered metal programmable as specific metallization patterns determine, or program, chip functions.

In one process flow 123 a particular metal programmable die is selected from the pool. The metal programmable die is metallized in block 125 so as to selectively couple selected components of the metal programmable die to provide specified functions for a chip.

In another process flow 115 a metal programmable die is selected from the pool. The metal programmable die is customized in block 117, for example by addition or subtraction of components to the base layer, or other modifications to portions of the base layer. In most embodiments the additions to the base layer, if any, are in terms of blocks, with the blocks preferably having components themselves referring to structures in a design library that are metal programmable. The new metal programmable die is added to the pool of dies in the library. The new programmable die is also metallized so as to provide specified functions for a chip.

In a further process flow 129 in accordance with aspects of the invention, no metal programmable die from the library is usable for a particular application. Instead, a custom die is designed 131, with the custom chip including a die having metal programmable components. The die is added to the pool of programmable dies, and the die is metallized 133 so as to provide specified functions for a chip.

The metal programmable pool therefore provides a supply of predesigned dies, generally of a verified and tested design, also preferably optimized from manufacturing yields, available to users. The use of the metal programmable die library provides for reduced design costs, reduced risks, and increased manufacturing yields.

Figure 2:
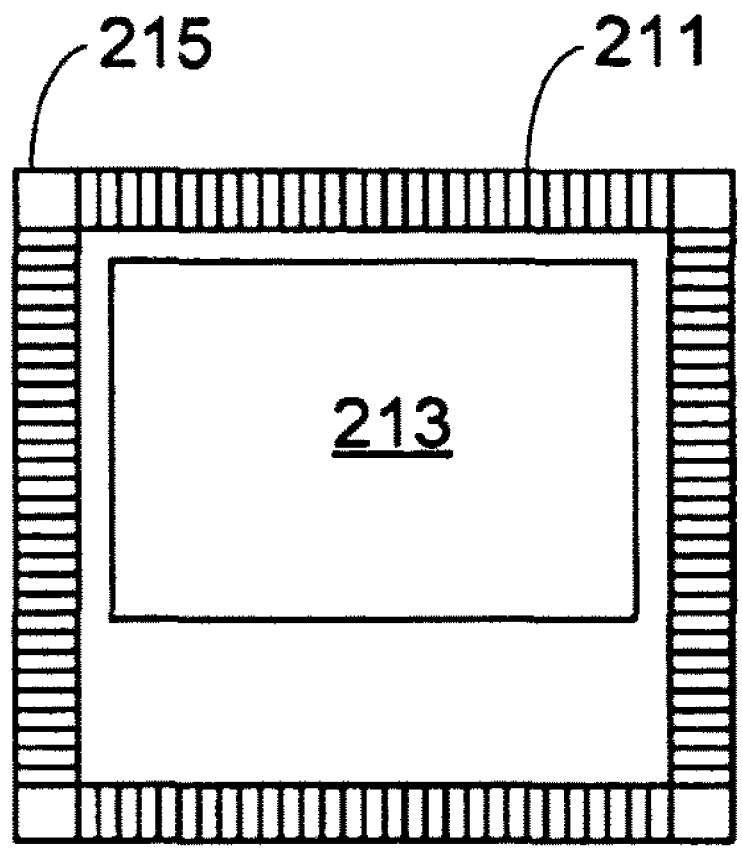
FIG. 2 illustrates a layout of an integrated circuit die in accordance with aspects of the invention.

FIG. 2 illustrates an example semiconductor die in the pool of dies of FIG. 1. The die includes an I/O ring 211 about the periphery of the die. The I/O ring includes a plurality of I/O slots. Corners 215 of the die include circuitry such as power reference circuitry, phase locked loops, and signal regeneration circuitry. The interior of the die includes core logic functions 213. For purposes of FIG. 2, core logic functions may include memory, higher level drive circuitry, and other circuitry performing functions that may not necessarily be considered core logic.

In most embodiments each of the portions of the circuitry of FIG. 2 are designed to be metal programmable. That is, each of the portions include a base layer including transistors or other circuit components that, depending on interconnections provided by metallization, allow the portions of the circuitry to be configured so as to provide varying functions. For example, each slot in the I/O ring may include a sufficient circuitry to provide for double data rate RAM interfacing, different drive or receiving levels for various other defined interfaces, or other circuit elements, hi any particular implementation, selected ones of the circuit elements may be interconnected by metallization to provide appropriate interfacing. Thus, the I/O slots are metal programmable to provide for a wide variety of interfacing. Similarly, core logic may include in its base layer a sea of gates formed by transistors, with selected ones of the gates of the seas of gates selectable for interconnection to provide for different logic functions.

A benefit of use of a die with a common base layer which is metal programmable is that the die may be configured by metallization to provide any number of different functions. Moreover, the base layer may be configured for optimized yield and to provide sufficient functions that many of the floor planning and other lay out functions may not need to be performed for any particular integrated circuit design. Therefore, a metal programmable base layer may be used to decrease risk, cost, and design time in development of integrated circuits.

In addition, it should be noted that in most embodiments the base layer refers generally to semiconductor portions of a die, and the base layer actually may be provided in several physical layers of the die, with the semiconductor physical layers interspersed by metal or dielectric layers.

Figure 3:
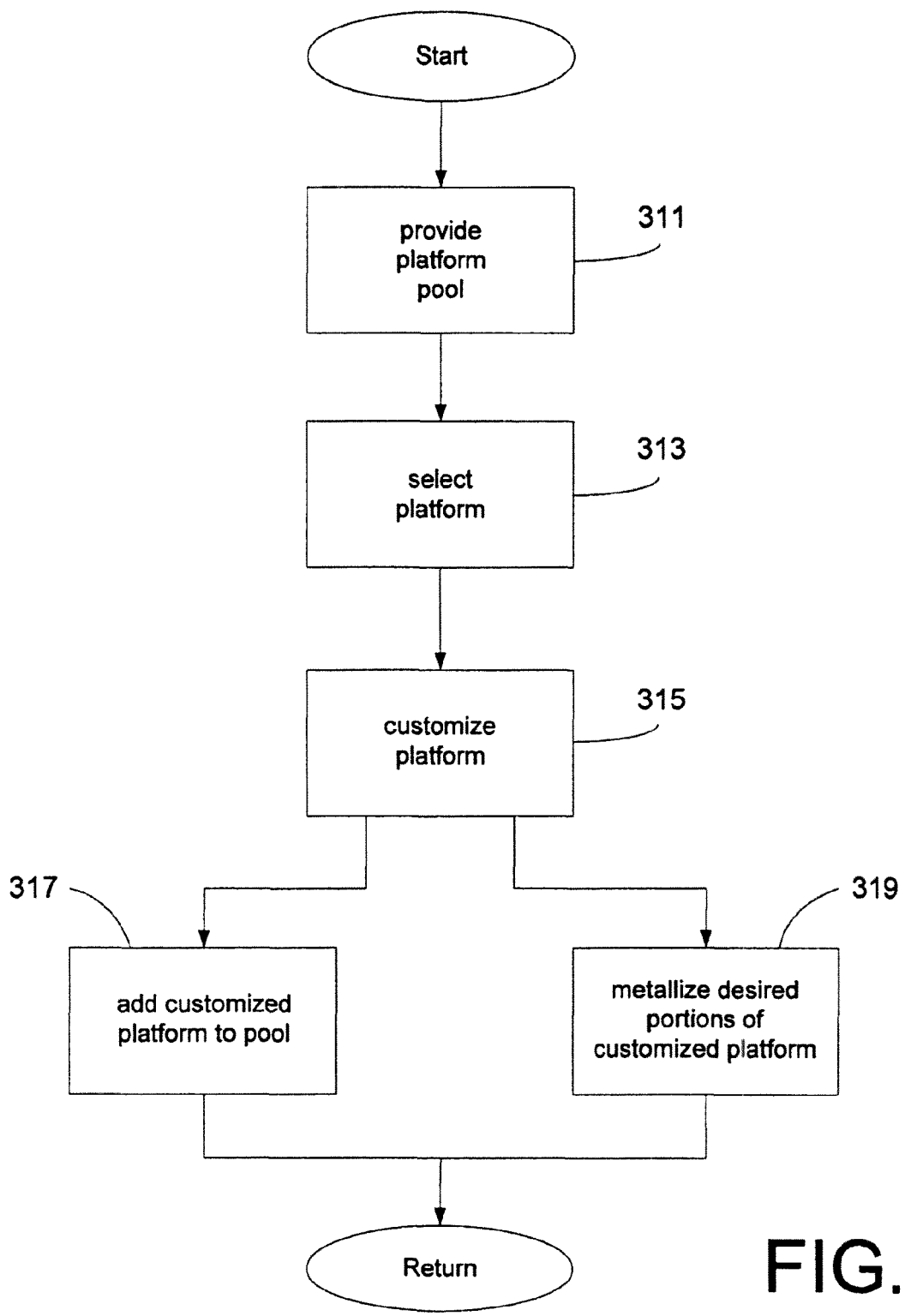
FIG. 3 is a flow diagram of a process for obtaining an integrated circuit die from a pool of dies, and for adding additional platforms to the pool.

FIG. 3 provides a flow diagram for use of a die including a metal programmable base layer, as well as a method for increasing the number of different metal programmable base layers available for use.

In block 311 a pool of metal programmable base layer dies are provided. Different metal programmable base layers in the pools may provide for differing amounts of memory, fewer or greater gates in the sea of gates, or include or exclude specific IP blocks.

In block 313 a platform from the pool of platforms is selected. Selection of any particular platform from the pool of platforms in most cases is guided by an amount of desired memory, expected gate requirements for specialized logic functions, amount of required I/O, and possibly other considerations. It should be recognized that many times a chip designer understands general requirements for a chip in mind, and these general requirements are often derived from the chip designer's own knowledge of chip functionality and requirements.

In block 315 the platform is customized for a specific use. For example, a particular platform may not fully meet the needs of a chip designer. For example, different sized memory blocks may be required by the chip designer, or the selected platform may not meet particular PLL requirements, or the base layer may be unable to accommodate a particular I/O standard. Thus, in block 315 the base layer of the platform is customized to include particular features. Preferably, any customizations to the base layer are performed in a way that is itself metal programmable. That is, if portions of the modified base layer are expected to provide a specified output of the particular clock frequency, then the metal programmable base layer will also include other components which may be connected through metallization to provide for circuit operation at somewhat varying clock frequencies, hi some embodiments customization is performed using a library specifying use of a metal programmable base layer.

In block 317 the customized platform is placed in the pool of base layer metal programmable platforms, hi parallel block 319 the customized platform is metallized to obtain desired chip characteristics. The process thereafter returns.

Figure 4:
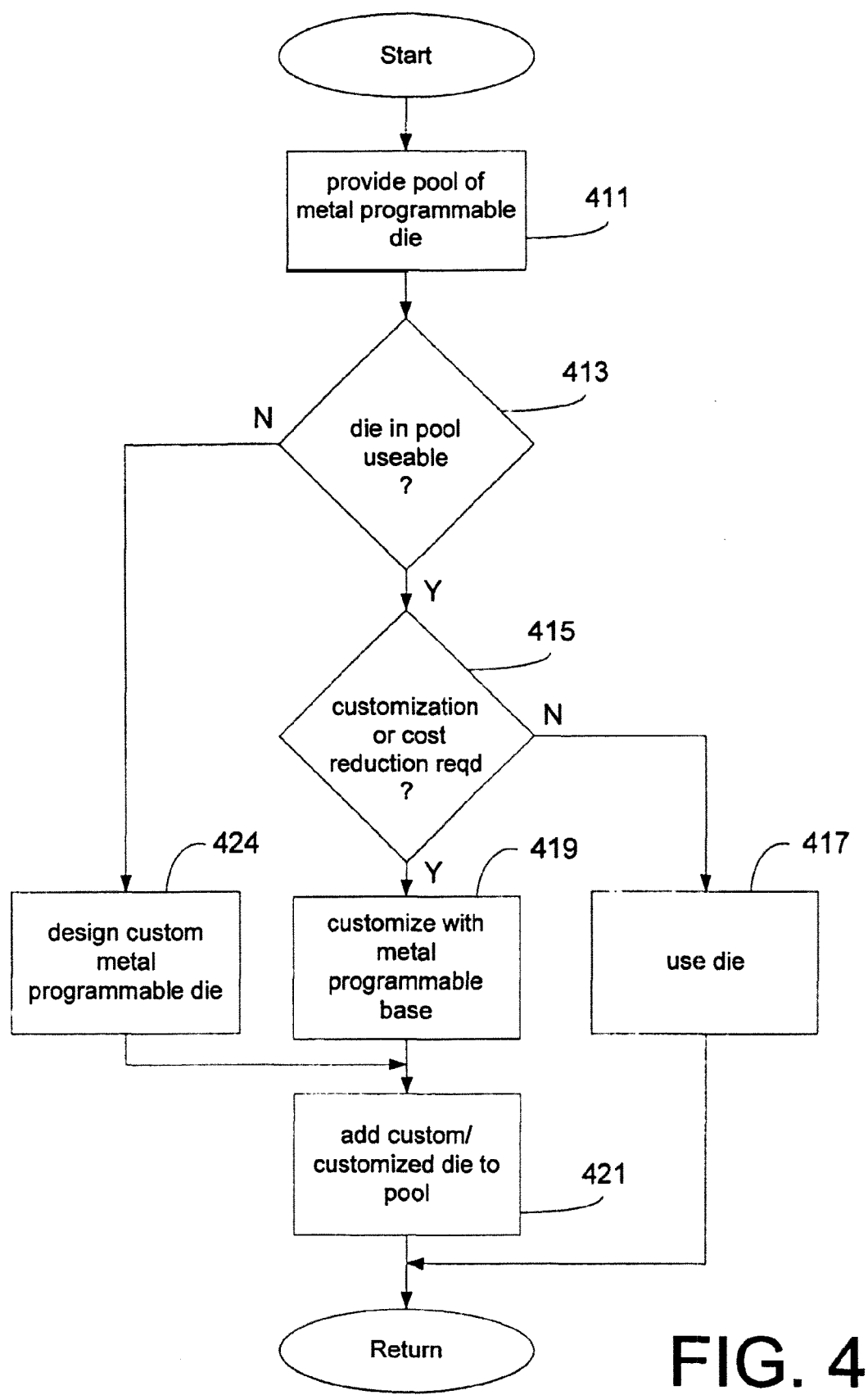
FIG. 4 is a process for integrated circuit design using a pool of metal programmable chips and increasing the size of the pool.

FIG. 4 provides a further flow chart in accordance with aspects of the invention, in block 411 a pool of metal programmable dies is provided.

In block 413 the process determines if a die in the pool is usable. Generally a chip designer will consider the dies available in the pool of metal programmable dies and determine if any of those dies are usable for the chip designer's needs. If such a die is useable, in block 415 the process determines if customization of the dies is required to achieve required functions or if cost reduction is required. Production of costs is often required for large lots of chips, such that the per-unit chip cost is of more importance. If customization or cost reduction is not required, then in block 417 the die is used. General use of the die entails metallization of the die to interconnect components of the base layer in the die to achieve a required operation of a chip.

If, however, customization or cost reduction is required, in block 419 the die is customized with a metal programmable base. Customization of the metal programmable base is performed by modifying the base layer, more particularly portions of the base layer, in a manner such that the particular requirements for the chip may be met, including cost requirements.

The customized die is then added to the pool of metal programmable dies for further use by others in block 421

If, however, in block 413 it is determined that no die in the pool was usable, then the process proceeds to block 423. In block 423 a custom metal programmable die is designed. A custom metal programmable die is designed using custom design techniques generally used for custom design of integrated circuitry. However, preferably the design is performed using a library of programmable components in which alternative components for every selected components are included within the die.

Upon design of the custom metal programmable die, the custom metal programmable die is added to the pool in block 421. The process thereafter returns.

In some cases a chip designer may have need for sufficiently extensive functions that a single die of the pool of dies may have insufficient floor space. In some embodiments, therefore, multi-tile dies are used as elements of the pool of metal programmable dies.

Figure 5:
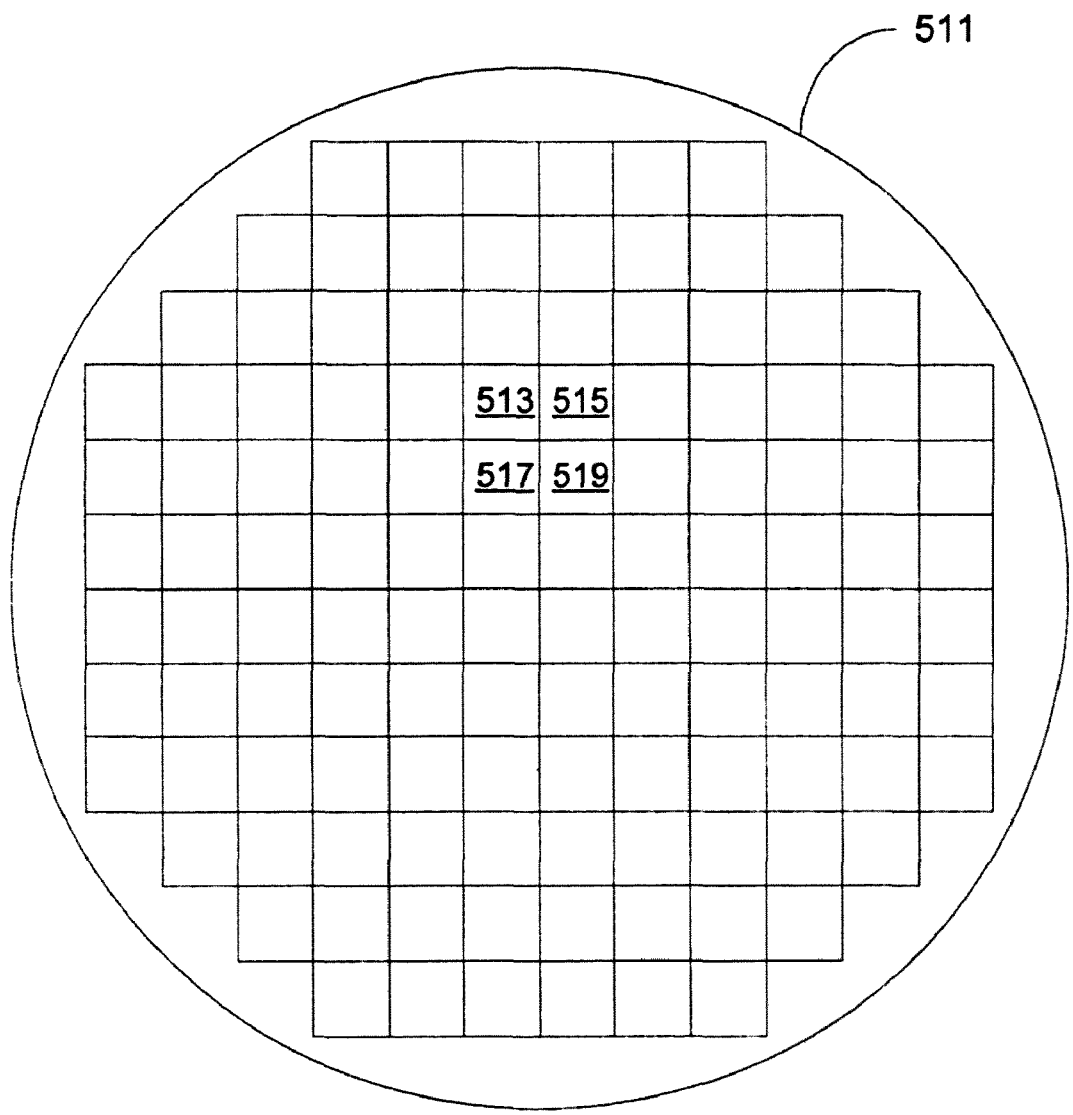
FIG. 5 illustrates a wafer including a plurality of dies.

FIG. 5 illustrates tiles formed on a semiconductor wafer. Sometimes the tiles are called dies, as the wafer is diced, usually along tile lines, to form individual dies. In some embodiments of the invention multiple tiles are used to form a single die. Dies are generally formed as part of operations on a single wafer, which may include many individual dies, and the individual dies may or may not be configured in the same manner, either with respect to base layers or metallization. Processing occurs across the wafer for all the dies present on the wafer, with the tiles later broken apart into individual dies after scribing of the wafer. As illustrated in FIG. 5 each tile in the wafer directly abuts another tile. In many cases, however, some distance is provided between tiles in the wafer to account for material loss related to scribing of the wafer.

The wafer of FIG. 5 is illustrated as having a particular number of tiles formed thereon. In general the number of tiles on a wafer depend on a number of factors, primarily such as the size of the wafer and the size of the tiles on the wafer. Four of the tiles of the wafer of FIG. 5 are specifically identified for purposes of discussion. A first tile 513, a second tile 515, a third tile 517, and a fourth tile 519 are shown as sharing a common corner between them, with the four tiles, each rectangular in shape, together forming a rectangular shape. Thus, the first tile shares a common side with the second tile and the first tile shares another common side with the third tile. Similar statements apply to the second tile with respect to the first tile and the fourth tile, to the third tile with respect to the first tile and the fourth tile, and to the fourth tile with respect to the third tile and the second tile.

Figure 6:
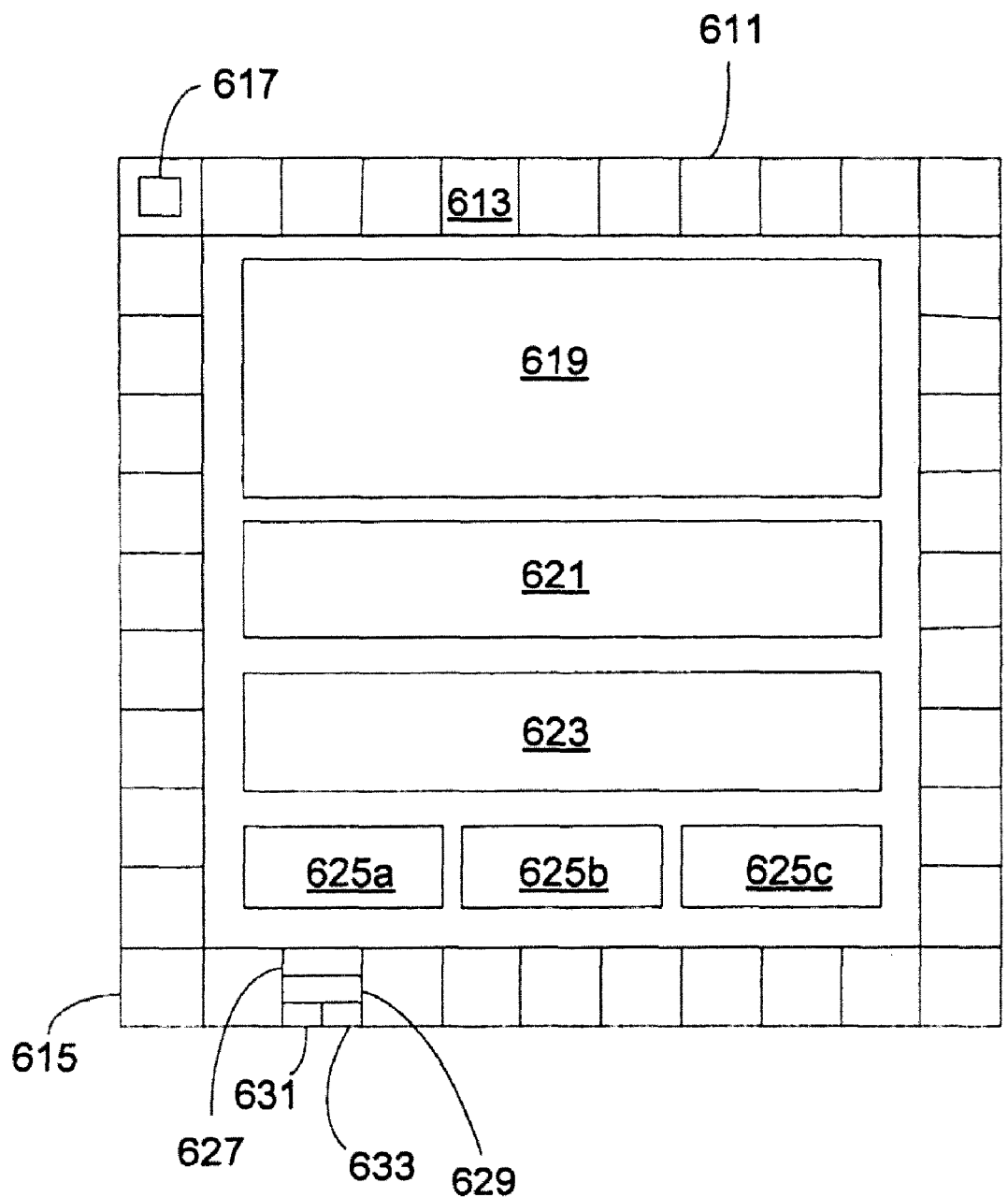
FIG. 6 illustrates a further die in accordance with aspects of the invention, with the further die including metal programmable multi-die capabilities.

FIG. 6 shows an example layout in block form for the first tile of FIG. 5. In various embodiments the layout of the first tile may vary from that of FIG. 6, and in various embodiments the other tiles may have the same layout as the first tile, or the layout of various tiles on the wafer may differ.

As illustrated in FIG. 6, the tile includes an I/O ring 611 substantially about the periphery of the tile. The I/O ring includes a plurality of I/O slots, for example including I/O slot 613. Corners 615 of the tile may include circuitry used by multiple components or blocks on the die. For example a corner may include power reference circuitry, or as illustrated a PLL 617.

The center portion of the tile may be considered as including core logic functions, although in many embodiments core logic functions additionally includes memory and memory related functions. Included within a center portion of the tile is a high level logic block 619, which may include a sea of gates for providing high level logic function. The center portion of the tile also includes device specific logic function blocks 621 and 623, and on chip memory blocks 625*a-c*.

A single I/O slot is illustrated in more detail in FIG. 6. The I/O slot includes a core logic interface portion 627 which provides for interfacing of the I/O slot with the core logic functions. The core logic interface portion often generally includes components which, depending on the metallization pattern, implements logic for forming signals in accordance with a selected I/O interface standard. The I/O slot also includes a conversion portion 629 which provides for converting signal levels from signal levels used in the core domain to signal levels used off-chip or, as will be further described, used in another abutting tile. The conversion portion is also metal programmable, and depending on selected interface requirements, may implement circuitry configured for performing different conversions.

The I/O slot, as illustrated, also includes two driver/receiver portions 631 and 633. In many embodiments only a single driver/receiver portion is used, with particular components selected by metallization, but two driver/receiver portions are used for purposes of discussion.

A first driver/receiver portion 631 includes components for driving signals and/or receiving signals in accordance with various I/O standards. The components may be selectively interconnected so as to drive and/or receive signals as required for proper I/O interfacing with off chip signal sources and signal sinks. In general the selected components are coupled to a pad on the chip, which may be coupled to wires and other structures for providing and receiving off chip signals.

A second driver/receiver portion 632 includes components for driving signals and/or receiving signals from an adjacent tile. In some embodiments the components are similar to components for providing intra-chip signal transmission and/or reception, although generally the components may have increased signal drive, for example, to sufficiently drive signals across intra-tile distances.

For instances when the tile is used as a single die, components of the first driver/receiver portion are coupled by metallization to provide required die capability. For instances when the tile is used as a multi-tile die, and the particular I/O slot is used for inter-tile intra-die communication, components of the second driver/receiver portion are coupled for use by metallization. Of course, it should be recognized that in many embodiments the first portion and the second portion may not be provided as distinct portions, but instead as a single portion which provides the requisite functions based on metallization patterns interconnecting components. Moreover, in some embodiments the second portion may not be provided, with the first portion used for inter-tile intra-die communication. Such an embodiment is not necessarily preferred, however, as doing so would likely result in increased power consumption.

In some embodiments a tile such as the tile of FIG. 6 is diced from the wafer to form a single die. An example of such a die is illustrated in FIG. 2. The die may be formed, for example, by the tile 513 of FIG. 5. Thus, the die of FIG. 2 may be considered a single tile die.

Figure 7:
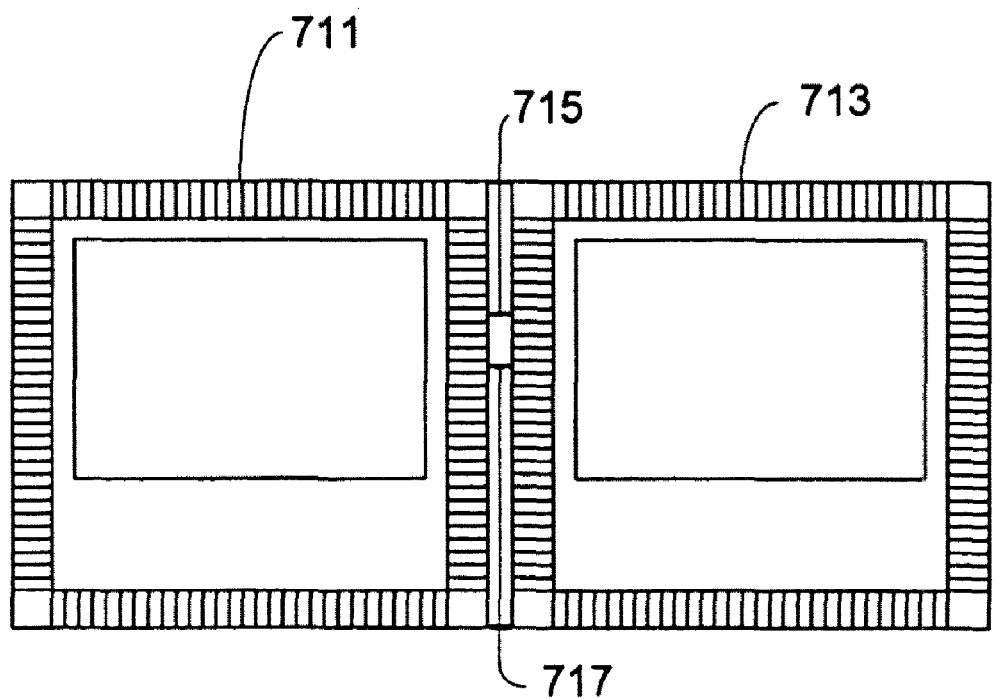
FIG. 7 illustrates a two-tile integrated circuit die in accordance with aspects of the invention.

FIG. 7 illustrates a two tile die. The two tile die may be formed, for example, by the tiles 513 and 515 of FIG. 5. Thus, the two tile die includes a portion formed by a first tile 711 and a portion formed by a second tile 713. As illustrated in FIG. 7, a first signal pathway 715 is formed, generally by metallization, between an I/O slot of the first tile and an I/O slot of the second tile, and a second signal pathway 717 is formed, also generally by metallization, between another I/O slot of the first tile and another I/O slot of the second tile. It should be recognized that while two signal pathways between the tiles are illustrated in FIG. 7, in most embodiments many more signal pathways are provided between I/O slots of the tiles, and the I/O slots need not be adjacent as illustrated in FIG. 7.

Figure 8:
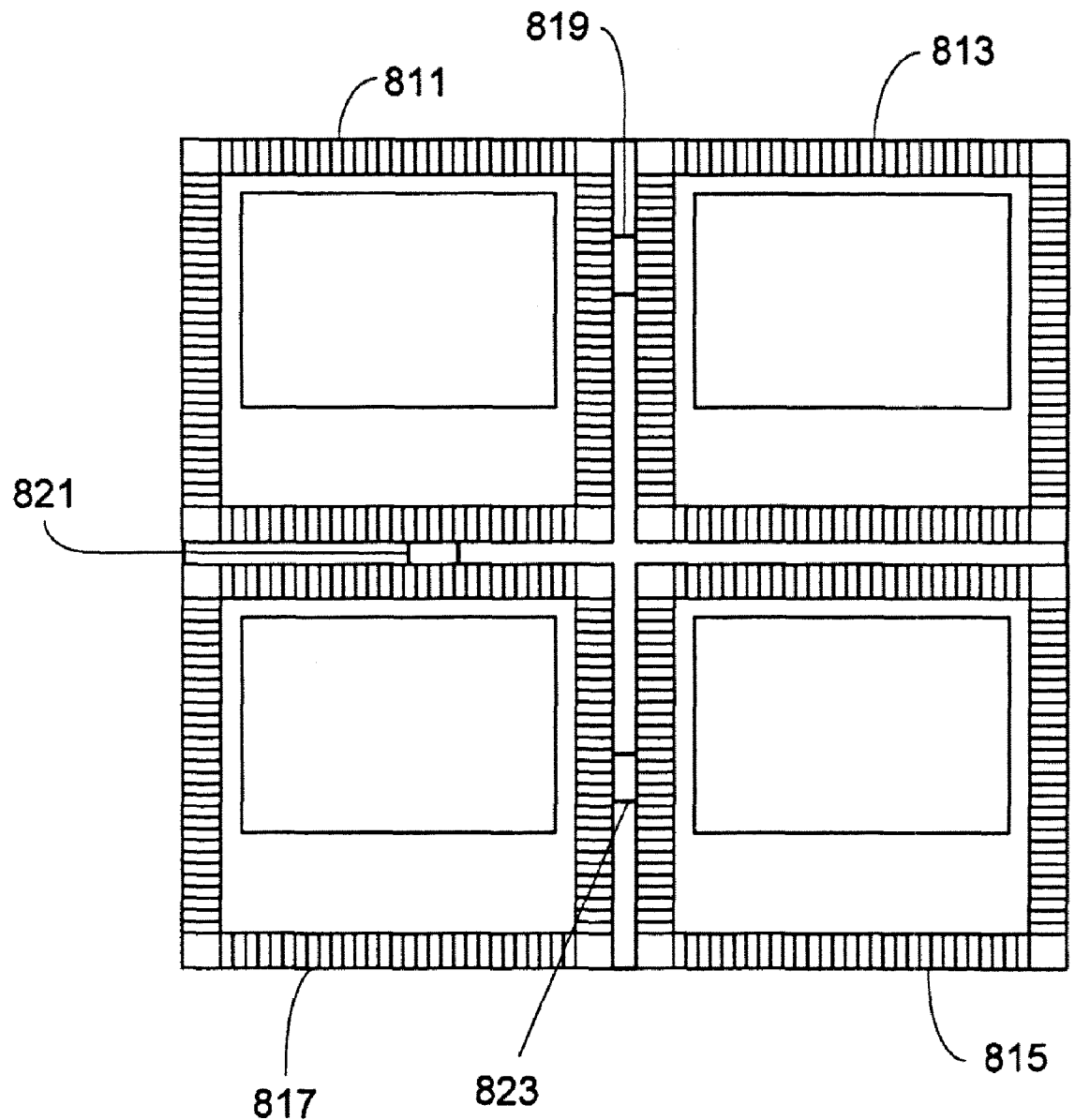
FIG. 8 illustrates a quad-tile integrated circuit die in accordance with aspects of the invention.

FIG. 8 illustrates a four tile die. The four tile die may be formed, for example, by the tiles 513, 515, 517 and 519 of FIG. 5. Thus, the four tile die includes a portion formed by a first tile 811, a portion formed by a second tile 813, a portion formed of a third tile 815, and a portion formed by a fourth tile 817. As illustrated in FIG. 8, a first signal pathway 819 is formed between an I/O slot of the first tile and an I/O slot of the second tile. Similarly, a second signal pathway is formed between an I/O slot of the first tile and an I/O slot of the fourth tile, and a third signal pathway is formed between an I/O slot of the third tile and the fourth tile. In the embodiment of FIG. 8, no signal pathways are formed between the second tile and the fourth tile. Of course, in different embodiments fewer or greater numbers of signal pathways between tiles may be used, and all of the tiles may be interconnected by signal pathways.

Accordingly, the invention provides metal programmable dies, pools of metal programmable dies, multi-tile metal programmable dies and methods of creating and using the same. Although the invention has been specifically discussed with respect to certain specific embodiments, it should be recognized that the invention may be practiced other than as specifically discussed, with the invention comprising the claims, and their insubstantial variations, supported by this disclosure.

What is claimed is:

1. A multi-tile die, comprising:
a plurality of tiles of a wafer forming a single die;
each of the plurality of tiles including I/O slots;
at least some of the I/O slots including a base layer configurable either for providing off die electrical signal communication or for providing intra die electrical signal communication;
with the base layer configurable by metallization.

2. A semiconductor wafer, comprising:
a plurality of tiles;
a plurality of dies;
each of the dies comprising at least one of the plurality of tiles;
each of the plurality of tiles including I/O slots;
at least some of the I/O slots including a base layer configurable by metallization either for providing off-die electrical signal communication or for providing intra-die electrical signal communication.

3. The semiconductor wafer of claim 2, wherein at least one of the plurality of dies is a multi-tile die comprising more than one of the plurality of tiles.

4. The semiconductor wafer of claim 3, wherein at least one of the plurality of dies is a single-tile die comprising one of the plurality of tiles.

* * * * *